United States Patent
Wilson

[19]

[11] Patent Number: 6,098,185
[45] Date of Patent: *Aug. 1, 2000

[54] HEADER-FORMATTED DEFECTIVE SECTOR MANAGEMENT SYSTEM

[75] Inventor: Aaron W. Wilson, Berthoud, Colo.

[73] Assignee: STMicroelectronics, N.V., Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/961,841

[22] Filed: Oct. 31, 1997

[51] Int. Cl.[7] .............................. G11C 29/00; G11C 7/00
[52] U.S. Cl. .............................. 714/710; 714/718; 360/25
[58] Field of Search .................................. 714/5, 7, 8, 49, 714/54, 710, 711, 724, 20, 30, 31, 32, 35, 48, 723; 711/201, 173, 129; 364/236.2, 246.3, 264.3, 268.5, 966.4, 967; 360/25; 369/272, 275.3

[56] References Cited

U.S. PATENT DOCUMENTS

| | | | |
|---|---|---|---|
| 3,771,143 | 11/1973 | Taylor | 340/172.5 |
| 4,914,529 | 4/1990 | Bonker | 360/48 |
| 5,036,408 | 7/1991 | Leis et al. | 360/48 |
| 5,235,585 | 8/1993 | Bish et al. | 369/54 |
| 5,848,438 | 12/1998 | Nemazie et al. | 711/201 |

*Primary Examiner*—Trinh L. Tu
*Attorney, Agent, or Firm*—Theodore E. Galanthay; Lisa K. Jorgenson; William J. Kubida

[57] ABSTRACT

A method and data structure for a header-formatted defective sector management system. A spare sector is allocated for each n sectors. When a defective one of the n sectors is identified, the sectors are slipped using the spare sector. The location of the defective sector and the type of defect, e.g., data field or header field, is indicated by a data structure written to the header field of at least one of the non-defective sectors. When a second defective sector is identified, the system operates to disposition the second defective sector based on the type of the first defective sector. If the first defective sector was a defect in the data field and the second defective sector is a defect in the header field then the first defective sector is converted to a reassigned sector and the second defective sector is slipped. This avoids the problem of reassigning a sector having a defective header field.

19 Claims, 4 Drawing Sheets

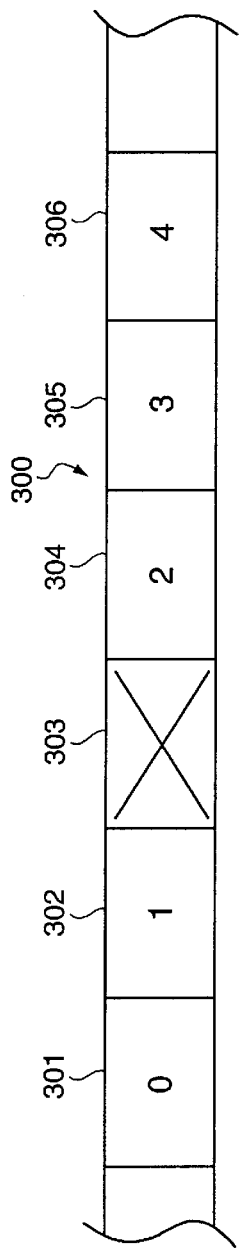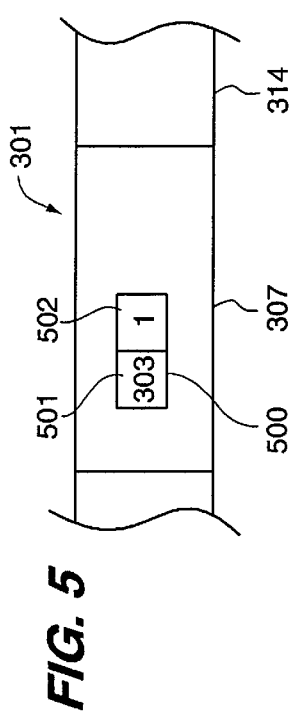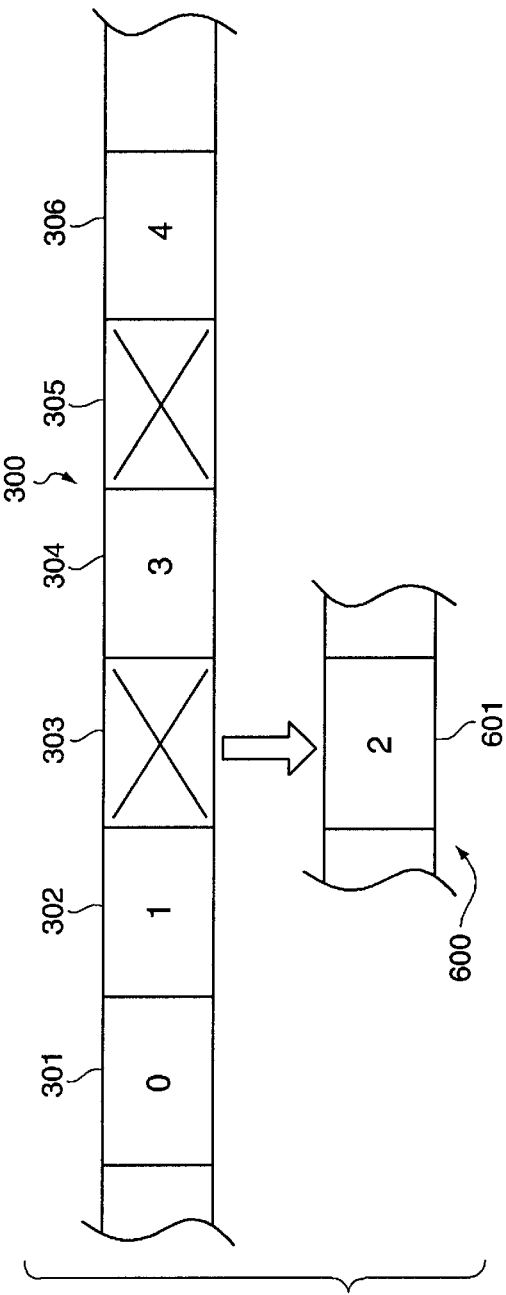
FIG. 4
FIG. 5
FIG. 6

HEADER-FORMATTED DEFECTIVE SECTOR MANAGEMENT SYSTEM

FIELD OF THE INVENTION

This invention relates to the field of managing defective sectors in a header-formatted magnetic disk device, and in particular to a system for managing defective sector information to allow the most efficient disposition of data when a defective sector is encountered.

PROBLEM

The recording media of a header-formatted magnetic data storage device is organized, at the lowest level, into sectors. A certain number of sectors represents a track while other numbers of sectors represent a cylinder or zone. There are also other groupings of sectors known to those skilled in the art. Each sector is comprised of a data field and a header field. The data field is the field within which data is written and stored and from which data is read. The header field contains identifying information for each sector such as, but not limited to, the location of the sector on the disk. A hard disk controller locates a specific sector on a disk by reading the header field of each sector until the desired sector is located.

Disk drive recording media virtually always have defective areas where it is impossible to reliably record and retrieve data. A disk drive system needs an approach or system for managing these defective sectors in an efficient way. Many different defective sector management systems have been devised.

One type of defective sector management system allocates a spare sector(s) for each group of related sectors. The related sectors which share a spare sector(s) may be all the sectors of a zone, cylinder, track or other grouping. The case where a spare sector is allocated for each track of ten sectors is used by way of example herein. Those skilled in the art of disk drive systems recognize that this is merely an example and that any grouping of sectors might share any number of spare sectors. When a defective sector is identified, the defective sector is marked as defective and the related sectors are reallocated using the spare sector. The defective sector thereafter goes unused. The sector number of the defective sector is embedded in the header field of other, non-defective, sectors. The spare sector is physically the last sector in the track. When a sector in the track is identified as defective, it is marked as defective and the data that would otherwise have been written to the defective sector is slipped to the next sector after the defective sector. All the remaining sectors of the track are also slipped whereby the final sector of the track utilizes the spare sector.

In the above noted defective sector management system, a defective sector is marked by writing an invalid sector number into the header field of the defective sector. Subsequently, when the defective sector is encountered by the hard disk controller it is ignored due to the invalid sector number written in the header field. When the number of defective sectors in a track exceeds the number of spare sectors available in the track, the remaining non-defective sectors can no longer be slipped within the track. In this case, the data that would otherwise be written to the defective sector is reassigned to an available spare sector in another track. Appropriate directional information is written to the header field of the defective sector so that the hard disk controller will properly locate the reassigned data when the defective sector is encountered. When the defective sector is encountered for which the corresponding data has been reassigned, the hard disk controller seeks to the new track, transfers the reassigned sector, seeks back to the original track, and completes the transfer. This incurs a significant performance loss as compared to simply slipping a sector on a track. Therefore, if a spare sector is available the hard disk controller will first choose to slip sectors in response to identifying a defective track and will reassign the data of a defective sector only when no spare sectors are available.

Most of the physical recording media of a sector is the data field of the sector while the header field comprises a relatively small portion of a sector. Therefore, most recording media defects occur in a data field rather than a header field. However, certain problems arise for this type of defective sector management system when a defect is present in the header field of a sector.

As noted above, a recording media defect means that data cannot be reliably read from the defective portion of the disk. Thus if a defect occurs in the header field of a track, the header field of a defective sector cannot be used as a pointer to a reassigned sector since the header field cannot be reliably read. This can result in yield loss, or alternatively it can require more complex defect management or error recovery schemes which typically cause undesirable side effects such as capacity and/or performance loss.

A header field defect is sometimes found after earlier data field defects were found and slipped thereby using up any available spare sectors in the track. Although the sector(s) having a data field defect(s) could be reassigned, there is no way in historic systems for knowing whether earlier occurring sector defects are header field defects or data field defects. Also, one does not want to automatically reassign data field defects and slip header field defects because the overhead of unnecessarily reassigning sectors is undesirable.

There exists a need for a defective sector management system that operates such that an earlier encountered slip of a data field defect is converted to a reassign such that a later encountered header field defect can then be slipped.

SOLUTION

The above described problems and others are solved and an advance in the art is achieved by the defective sector management system of the present invention. The system of the present invention embeds information about the type of defect encountered in one sector into the header field of related, non-defective sectors. When a defective sector is encountered and slipped, the sector number and the defect type are both embedded in the header field of the related sectors. When a second defective sector is encountered, the most efficient disposition of the second defective sector is achieved using the embedded information regarding the first defective sector.

The following example of the operation of the present invention assumes that each track of 10 sectors includes one spare sector. Those skilled in the art of disk management systems recognize that this is merely one exemplary application of the system of the present invention. The first identified defective sector is slipped, regardless of whether the sector has a header field defect or a data field defect. The sector number and defect type of the first defective sector are embedded in the header fields of the other sectors in the same track. Also, the header field of the defective sector is written with an invalid sector number so that the hard disk controller knows to skip the defective sector when it is later encountered.

If a second defective sector is identified, subsequent operation of the system of the present invention depends upon whether the second defective sector has a header defect or a data defect. If the second defective sector has a data defect then the second defective sector is reassigned to a spare sector in a different track. If, however, the second defective sector has a header defect, then its reassignment is not possible because its header field cannot be relied upon as a pointer to a reassigned sector. Therefore, the system of the present invention reads the header field of a non-defective sector in the same track to determine if the first defective sector was due to a header defect or a data defect. If the second defective sector has a header defect and the first defective sector was a data defect, the track is reformatted by converting the slipped first defective sector to a reassigned sector and then slipping the second defective sector. Thus, the defective sector management system of the present invention utilizes the relatively inefficient reassign process only when necessary but when it is necessary the required information, in the form of the defect type of earlier an defective sector(s), is available.

BRIEF DESCRIPTION OF THE FIGURES

FIG. 4 depicts the track of FIG. 3 after a first defective sector is identified;

FIG. 5 depicts a defect data structure within the header field of one sector in the track of FIG. 4;

FIG. 6 depicts the track of FIG. 3 after a second defective sector is identified.

Figure 1:
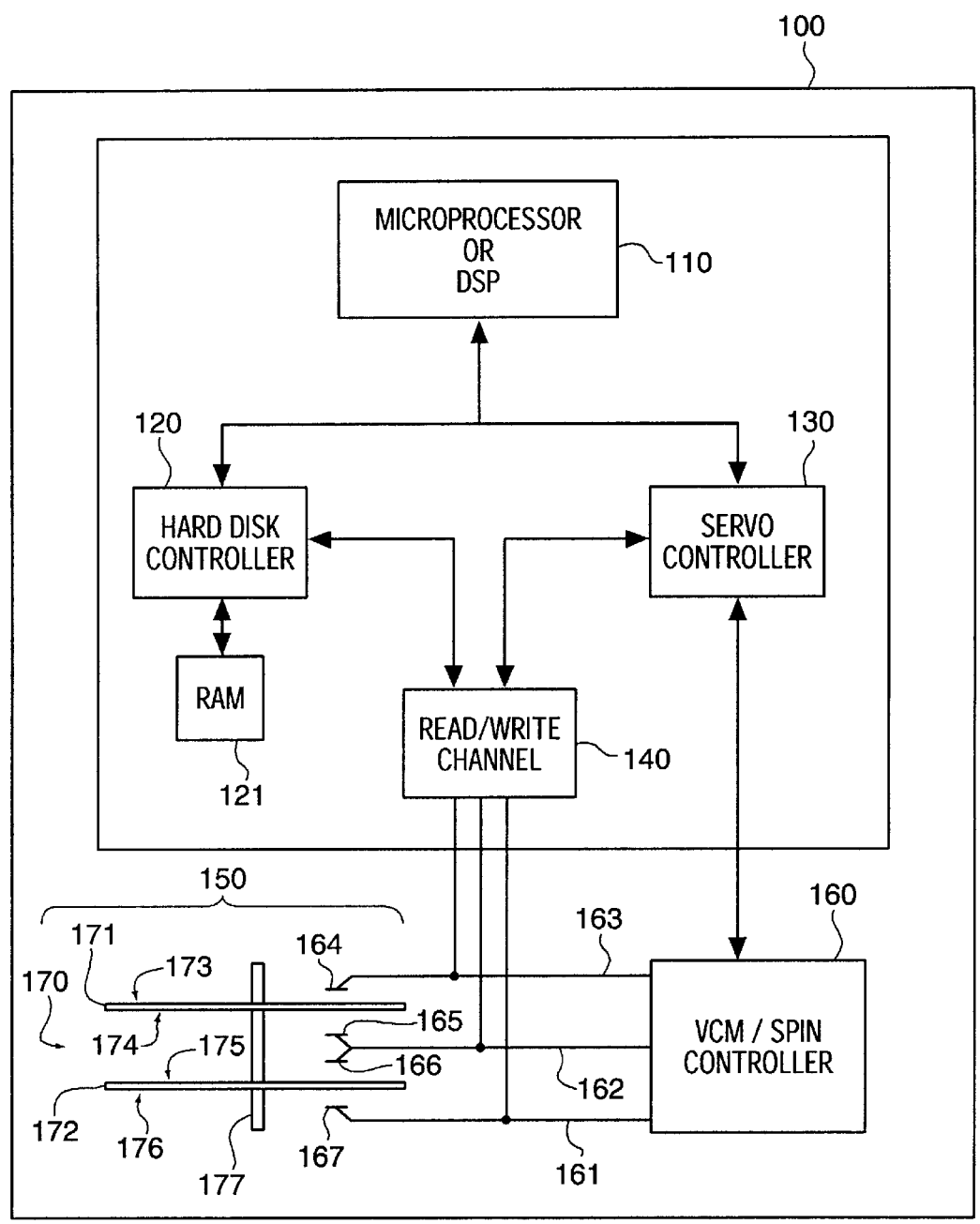
FIG. 1 depicts a system level architecture view of a magnetic disk device in block diagram form.

DETAILED DESCRIPTION
Magnetic Disk Device Architecture—FIG. 1

FIG. 1 illustrates a system level architecture view of a magnetic disk device 100 in block diagram form. The primary components in magnetic disk device 100 include, but are not limited to, disk control components 110–140 and operational disk components 150–160. Disk control components 110–140 include, but are not limited to, a microprocessor or Digital Signal Processor (DSP) 110, a Hard Disk Controller (HDC) 120 with accompanying RAM 121, a servo controller 130, and a read/write channel controller 140. The microprocessor or DSP 110 is the highest level of control and coordination for all disk device activities and read/write operations executed by the disk control components. HDC 120 manages and caches all data being written to and/or read from the magnetic disk 170. RAM 121 is used as a data cache in addition to table storage for disk related information such as split data sector information and/or defective data sector information as is done in conventional magnetic disk devices. The servo controller 130 interprets servo field information and controls positioning activities of read/write heads. Read/write channel 140 passes data between the operational disk components 150–160 and the disk control components 110–130 for each read/write operation.

Operational disk components 150–160 include, but are not limited to, a Head and Disk Assembly (HDA) 150 that includes magnetic disk 170 and read/write heads 164–167, a Voice Coil Motor (VCM)/spin controller 160 that is operatively connected to access arms 161–163 through a voice coil motor (not shown apart from VCM/spin controller 160). Magnetic disk 170 is comprised of one or more platters 171–172. Each platter has at least one and typically two magnetic recording surfaces as illustrated for the first and second surfaces 173–174 and 175–176 of platters 171–172 respectively. Each of the platters 171–172 of a multiple platter magnetic disk 170 are rigidly fixed to a spindle 177 along a common central axis. VCM/spin controller 160 manages the appropriate physical movements of the access arms 161–163. VCM/spin controller 160 also manages the movement of spindle 177. Read/write heads 164–167 are positioned to fly just off the recording surfaces 173–176 respectively when the magnetic disk 170 is spinning. Although other magnetic disk device architectures are possible other than the architecture described above, no limitation is intended or implied with respect to the present invention. The present invention is applicable to any header-formatted magnetic or optical disk regardless of a single platter or multiple platter implementation or a removable medium or floppy disk medium.

Figure 2:
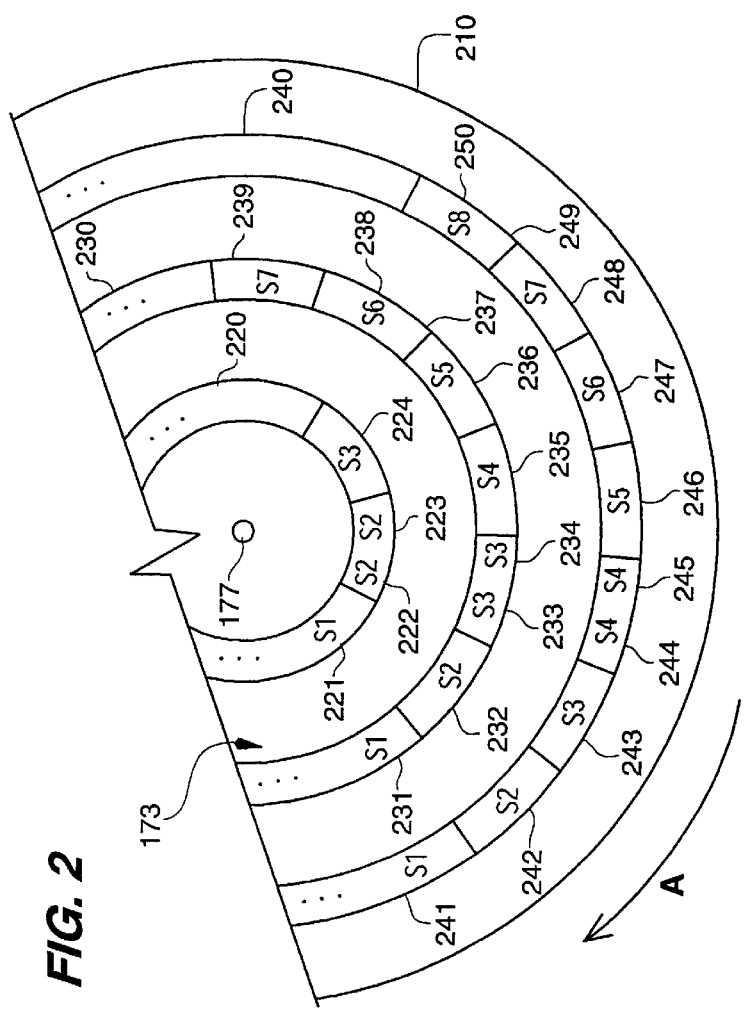
FIG. 2 illustrates the track and sector format for a recording surface of a recording media used in the magnetic disk device of FIG. 1.

Magnetic Disk Format—FIG. 2

FIG. 2 illustrates the track and sector format for a recording surface such as recording surface 173 of magnetic disk 170. Recording surface 173 comprises a plurality of concentric tracks of successively increasing size from the center spindle 177 to the outer edge 210. The present illustration focuses on tracks 220, 230, and 240. A cylinder is the set of all tracks of a given size from each recording surface of each platter in magnetic disk 170. Thus, if track 230 is the 6th concentric track of recording surface 173 and each recording surface of magnetic disk 170 has a 6th concentric track, then there exists a 6th cylinder for magnetic disk 170 that comprises each 6th concentric track of each recording surface. With a single motion of access arms 161–163, each read/write head 164–167 can be simultaneously positioned to read and/or write data from any one or more of the recording surfaces 173–176 in cylinder 6. Those skilled in the art recognize that, for a disk system using tone arm actuators, the tracks are arranged along radii of arcs matching the motion of the tone arm to which read/write heads 164–167 are attached. If track 230 is the 6th track and read/write heads 164–167 are numbered 00 through 03 respectively, then the cylinder CC and head HH address for track 230 on recording surface 173 would be "0600". Each track is comprised of multiple sectors. For example, sectors 221–224 are shown for track 220 in FIG. 2. Each sector is itself comprised of multiple fields.

Figure 3:
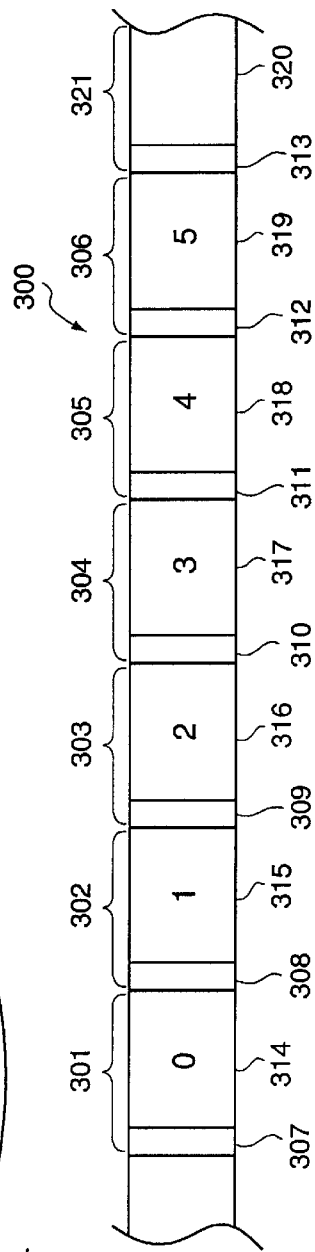
FIG. 3 depicts a single track comprised of six sectors on a recording media.

Track Format—FIG. 3

FIG. 3 depicts a single track 300 comprised of sectors 301–306. Each one of sectors 301–306 includes a data field 314–319, respectively. The data field contains the data stored at each sector. Each one of sectors 301–306 also includes a header field 307–312, respectively. The header field contains various administrative information about the sector, including but not limited to, positional information about the sectors physical position on the recording media. Header fields 307–312 and data fields 314–319 may themselves include further fields but a discussion of the present invention does not require a further breakdown of these fields. Data field 320 and header field 313 comprise a sector 321 that is part of a next track (not shown) on the recording media.

The remaining description assumes that the recording media is formatted into tracks with six sectors one of which is a spare sector. This, of course, is merely exemplary of the formatting of a recording media and those skilled in the art will recognize that the system and methods of the present invention are applicable to any header-formatted disk system.

Slipping and Reassignment of Defective Sectors—FIGS. 3–6

FIGS. 3–6 are described to illustrate the operation of the present invention. Track 300 of FIG. 3 is referred as the home track as it is the track from which the disposition of defective sectors is described. The reference numerals 301–306 represent the physical sectors of track 300 wherein sector 306 is the spare sector for track 300. The numerals 0–5 represent the logical numbering of sectors 301–306. Before a first defective sector is found in track 300, logical sectors 0–5 correspond to physical sectors 301–306, respectively.

FIG. 4 illustrates track 300 after a data field defect has been identified at physical sector 303 of track 300. The data of sector 303 has been slipped to sector 304 and likewise the data have sectors 304–305 have been slipped so that the spare sector 306 now contains the data of sector 305. The track is reformatted so that the logical numbering of the track is consistent with the slipped tracks. For example, physical sector 304 was logical sector 3 prior to the detection of the defective sector. After detection of the defective sector and slipping of the sectors, physical sector 304 is re-formatted as logical sector 2. Physical sector 303 has a non-valid sector number written in its header field so that it thereafter identified as defective sector and is no longer used by the hard disk controller.

In addition to writing the defective sector with an invalid sector number, a defect data structure is written to the header field of at least one of the non-defective sectors in track 300. FIG. 5 illustrates a defect data structure 500 in header field 307 of sector 301 of track 300. Defect data structure 500 includes field 501 which contains the physical sector number of the defective sector 303. Field 502 indicates whether the defect in sector 303 is a header field defect (indicated by a logical 0) or a data field defect (indicated by a logical 1). In the case where a defective sector management system of the present invention uses multiple spare sectors per grouping of sectors, the defect data structure is modified so that the defect location and type information is stored for each slipped sector. Defect data structure 500 indicates that physical sector 303 is defective and that the defect is in the data field.

Track 300 of FIG. 4 has no more spare sectors. Thus when a second defective sector is identified in track 300 there must be a reassignment of one sector's data to an available spare sector in another track. Say a second defective sector is identified at physical sector 305 and the defect is in the header field of sector 305. A check of defect data structure 500 determines that the defect in sector 303 is a defect in the data field. The system of the present invention chooses to re-format track 300 to achieve the most efficient disposition of the track's data given the defect types. Sector 303 is converted from a slipped sector to a reassign sector and sector 305 is slipped, as discussed with respect to FIG. 6.

FIG. 6 depicts the re-formatted track 300 and track 600 to which the data of sector 303 is reassigned. Logical sector 2 of track 300 was originally located at physical sector 303 of track 300, as shown in FIG. 3. When physical sector 303 was determined to have a defect in its data field, logical sector 2 was slipped to physical sector 304, as shown in FIG. 4. Identification of a defect in the header field of sector 305 means that sector 305 cannot be reassigned since its header field cannot be reliably read. However, there are no remaining spare sectors in the track to which sector 305 can be slipped. Using the defect data structure 500 embedded in the header field of at least one sector in track 300, the present invention chooses to re-format track 300 as shown in FIG. 6.

Sector 303 is converted from a slip to a reassign. This means that the data of logical sector 2 is reassigned to sector 601 of track 600. Sector 601 is an available spare sector on a nearby track 600. Track 300 is re-formatted while slipping sector 305 to spare sector 306. The result is that logical sectors 0 and 1 remain as physical sectors 301–302, respectively. Logical sector 2 is reassigned to spare sector 601 of track 600. Logical sector 3 is physical sector 304—the same as the original track 300 in FIG. 3. Finally, logical sector 4 is slipped from defective sector 305 to spare sector 306. Sector 305, which has a defect in its header field, does not have to be read for a pointer to a reassigned field since it is now slipped. The header field, which is not defective, of sector 303 has written to it pointer information to allow the hard disk controller to seek to sector 601, transfer the data of sector 601, seek back to home track 300, and continue processing at sector 304.

Figure 7:
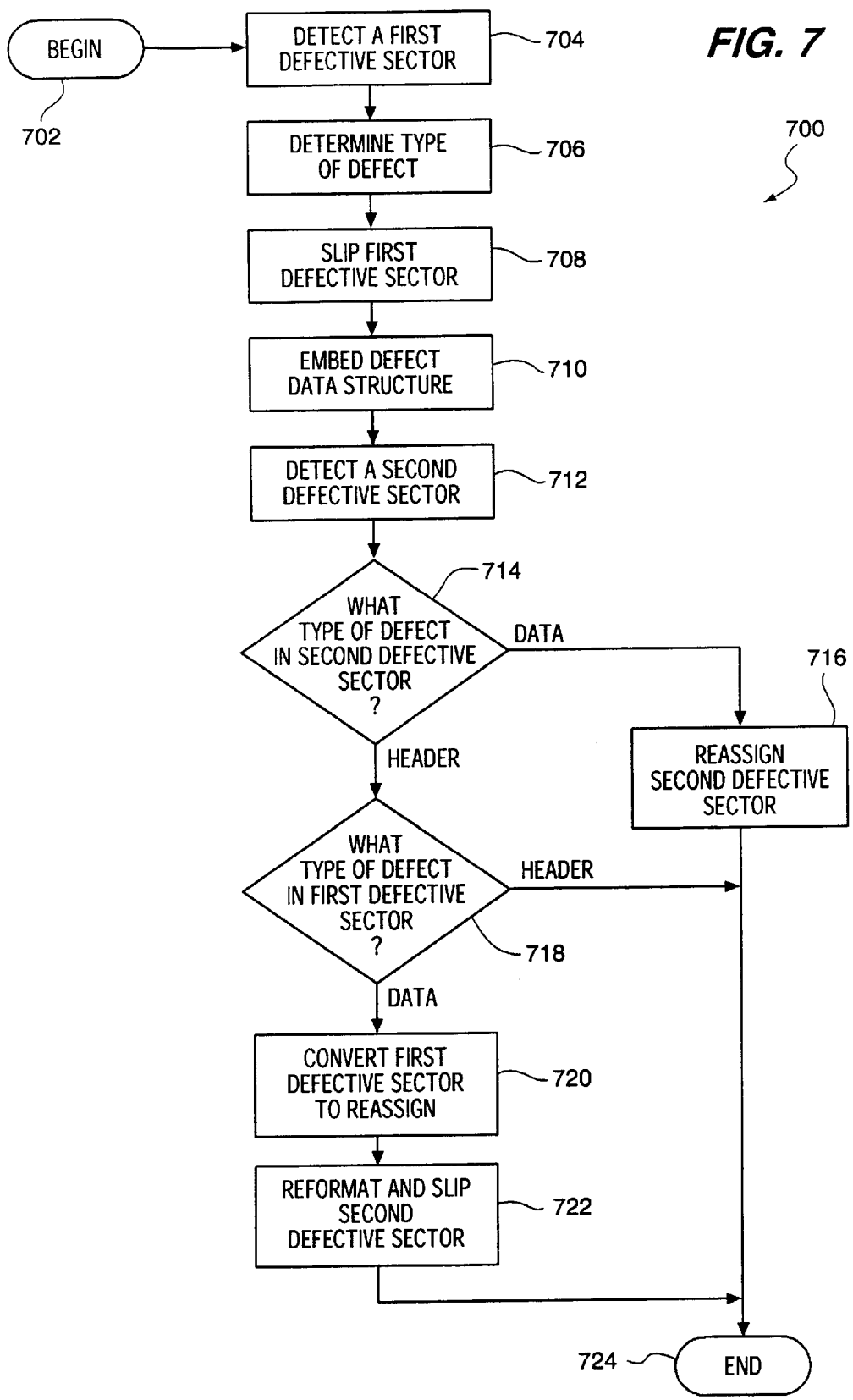
FIG. 7 is a flowchart illustrating the processing steps of the system of the present invention.

Method of the Present Invention—FIG. 7

FIG. 7 is a flowchart 700 illustrating the processing steps executed by the defective sector management system of the present invention. Processing begins with element 702 which corresponds, for example, to the initiation of operation of disk drive system 100. Processing proceeds to step 704.

During step 704 a first defective sector in a group of n sectors is identified. In the above example of FIGS. 3–6, n is equal to 6 sectors which is, in the above example, equal to one track. Those skilled in the art recognize that n could be equal to any number and that n need not correspond to track size. Also, the last physical sector or sectors of the n sectors need not be the spare sectors. The examples herein show the last sector of each track as the spare sector simply for the sake of convenience. Processing proceeds from step 704 to step 706.

During step 706 the system of the present invention determines the type of defect identified during step 704. For purposes of the present invention, defect type is determined by the location of the defect within a sector. A defect within the data field of a sector is a data defect and a defect within the header field of a sector is a header defect. Processing next proceeds to step 708.

During step 708 the defective sector is slipped, as described with respect to FIGS. 3–6. The first defective sector is slipped regardless of whether it is a data defect or a header defect. Processing then proceeds to step 710.

During step 710 the defect data structure is embedded in at least one other sector of the group of n sectors. Preferably, the defect data structure is embedded in the header field of at least one non-defective sector. The defect data structure may be embedded in the header field of each one of the n sectors. Processing next proceeds to step 712.

During step 712 a second defective sector is identified in the group of n sectors. Processing then proceeds to decision block 714.

Decision block 714 operates to determine what type of defect exists in the second defective sector. If the second defective sector is a data defect then processing proceeds to step 716 where the second defective sector is reassigned to a spare sector in a second group of n sectors. This assumes, of course, that there are not multiple spare sectors available in each group of n sectors. If there are multiple spare sectors in each group of n sectors then all the spare sectors are used before any reassignment occurs. If by operation of decision block 714 it is determined that the second defective sector is a header defect then processing continues decision block 718.

Decision block 718 operates to determine what type of defect exists in the first defective sector. If it is determined that the first defective sector was a data defect then processing continues to step 720.

During step 720 the first defective sector is converted from a slip to a reassign. This means that the data of the first defective sector that was slipped within the original group of n sectors is now reassigned to a spare sector in another group of n sectors. Processing next proceeds to step 722.

During step 722 the original group of n sectors is re-formatted and the second defective sector is slipped. Processing proceeds from steps 716, 718 and 722 to element 724. Element 724 corresponds, for example, to the termination of operation of hard disk system 100.

It is to be expressly understood that the claimed invention is not to be limited to the description of the above embodiments but encompasses other modifications and alterations within the scope and spirit of the inventive concept.

What is claimed is:

1. A method for managing defective sectors in a header-formatted storage system, comprising the steps of:

allocating at least one spare sector for every n sectors on a header-formatted storage media;

detecting a first defect in one of said n sectors, said sector in which said first defect is detected becoming a first defective sector;

writing said first defective sector with an invalid sector number to prevent said first defective sector from being utilized; and embedding a defect data structure in at least one non-defective sector of said n sectors, said defect data structure indicating a type of defect in said first defective sector.

2. The method of claim 1 further comprising the step of:

slipping the content of said first defective sector to a first non-defective sector whereby said at least one spare sector is utilized.

3. The method of claim 2 wherein said slipping step includes:

slipping by one sector the content of said first defective sector and all of said n sectors following said first defective sector whereby the content of a last of said n sectors is slipped to said spare sector.

4. The method of claim 1 wherein said embedding step includes:

determining a sector number of said first defective sector;

determining said type of defect in said first defective sector;

combining said sector number and said defect type to form said defect data structure; and writing said defect data structure within a header field of at least one non-defective sector of said n sectors.

5. A method for managing defective sectors in a header-formatted storage system comprising the steps of:

allocating at least one spare sector for every n sectors on a header-formatted storage media;

detecting a first defect in one of said n sectors, said sector in which said first defect is detected becoming a first defective sector;

writing said first defective sector with an invalid sector number to prevent said first defective sector from being utilized; and embedding a defect data structure in at least one non-defective sector of said n sectors, said defect data structure indicating a type of defect in said first defective sector;

slipping the content of said first defective sector to a first non-defective sector whereby said at least one spare sector is utilized;

detecting a second defect in one of said n sectors, said sector in which said second defect is detected becoming a second defective sector;

reading said defect data structure to determine the type of defect in said first defective sector; and locating the content of said second defective sector responsive to the type of defect in said first defective sector.

6. The method of claim 5 wherein said step of detecting a second defect includes:

detecting a second defect in one of said n sectors; and determining whether said second defect occurs within the header field of said second defective sector or within the data field of said second defective sector.

7. The method of claim 6 wherein said reading step includes:

reading, responsive to a determination that said second defect occurs within the header field of said second defective sector, said defect data structure; and determining whether said first defect occurred within the header field of said first defective sector or within the data field of said first defective sector.

8. The method of claim 7 wherein said locating step includes:

retrieving, responsive to a determination that said first defect occurred within the header field of said first defective sector, the content of said first defective sector from said non-defective sector;

reassigning the content of said first defective sector to a second non-defective sector; and writing the content of said second defective sector to said first non-defective sector.

9. A computer-readable medium having header-formatted data stored thereon including a data structure, comprising:

a first data field in said header containing data causing a computer reading the first data to detect the number of a defective sector, said defective sector being one of n sectors on the computer-readable medium; and a second data field in said header containing data causing a computer reading the first data to detect a type of defect found in said defective sector.

10. The computer-readable medium of claim 9, wherein said second data field includes:

data representing a data field defect in said defective sector.

11. The computer-readable medium of claim 9, wherein said second data field includes:

data representing a header field defect in said defective sector.

12. A system for managing header-formatted sectors in a defective sector management system, comprising:

means for detecting a first defective sector in one of n sectors where at least one spare sector exists for each said n sectors;

means for writing said first defective sector with an invalid sector number to prevent said first defective sector from being utilized; and means for embedding a defect data structure in at least one non-defective sector of said n sectors, said defect data structure indicating a type of defect in said first defective sector.

13. The system of claim 12, further comprising:

means for slipping the content of said first defective sector to a first non-defective sector whereby said at least one spare sector is utilized.

14. The system of claim 13 wherein said means for slipping includes:

means for slipping by one sector the content of said first defective sector and all of said n sectors following said first defective sector whereby the content of a last of said n sectors is slipped to said spare sector.

15. The system of claim 12 wherein said means for embedding includes:

means for determining a sector number of said first defective sector;

means for determining said type of defect in said first defective sector;

means for combining said sector number and said defect type to form said defect data structure; and means for writing said defect data structure within a header field of at least one non-defective sector of said n sectors.

16. A system for managing header-formatted sectors in a defective sector management system comprising:

means for detecting a first defective sector in one of n sectors where at least one spare sector exists for each said n sectors;

means for writing said first defective sector with an invalid sector number to prevent said first defective sector from being utilized; and means for embedding a defect data structure in at least one non-defective sector of said n sectors, said defect data structure indicating a type of defect in said first defective sector;

means for slipping the content of said first defective sector to a first non-defective sector whereby said at least one spare sector is utilized;

means for detecting a second defective sector in one of said n sectors;

means for reading said defect data structure to determine the type of defect in said first defective sector; and means for locating the content of said second defective sector responsive to the type of defect in said first defective sector.

17. The system of claim 16 wherein said means for detecting a second defect includes:

means for detecting a second defect in one of said n sectors; and means for determining whether said second defect occurs within the header field of said second defective sector or within the data field of said second defective sector.

18. The system of claim 17 wherein said means for reading includes:

means for reading, responsive to a determination that said second defect occurs within the header field of said second defective sector, said defect data structure; and means for determining whether said first defect occurred within the header field of said first defective sector or within the data field of said first defective sector.

19. The system of claim 18 wherein said means for locating includes:

means for retrieving, responsive to a determination that said first defect occurred within the header field of said first defective sector, the content of said first defective sector from said non-defective sector;

means for reassigning the content of said first defective sector to a second non-defective sector; and means for writing the content of said second defective sector to said first non-defective sector.

* * * * *